(No Model.)

C. H. SCOFIELD.
CAMERA SHUTTER.

No. 269,472. Patented Dec. 19, 1882.

WITNESSES:

INVENTOR:
C. H. Scofield
BY Munn & Co.
ATTORNEYS.

UNITED STATES PATENT OFFICE.

CHARLES H. SCOFIELD, OF UTICA, NEW YORK.

CAMERA-SHUTTER.

SPECIFICATION forming part of Letters Patent No. 269,472, dated December 19, 1882.

Application filed September 4, 1882. (No model.)

*To all whom it may concern:*

Be it known that I, CHARLES H. SCOFIELD, of Utica, in the county of Oneida and State of New York, have invented a new and Improved Camera-Shutter, of which the following is a full, clear, and exact description.

The object of my invention is to facilitate the opening and closing of a camera-shutter in such a manner that the camera will not be disturbed.

The invention consists in the combination, with a camera-shutter, of a flexible tubing and a device for forcing air into the same for distending it, whereby it will remove the shutter from the lens-aperture.

The invention further consists in the combination, with the above-named devices, of a stud against which the tubing rests, and which stud forms the turning-point for the shutter.

The invention further consists in a check-stud and check and guide-frame to regulate the movements of the shutter.

The invention also consists in the arrangement, construction, and combination of parts, as will be fully described hereinafter.

Reference is to be had to the accompanying drawings, forming part of this specification, in which similar letters of reference indicate corresponding parts in all the figures.

Figure 1:
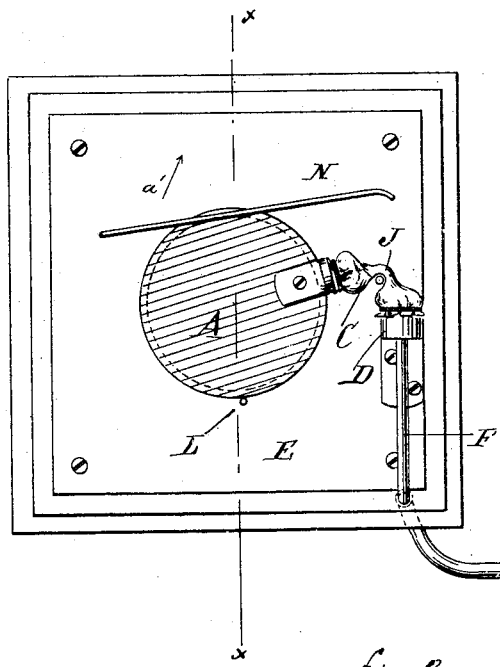
Figure 2:
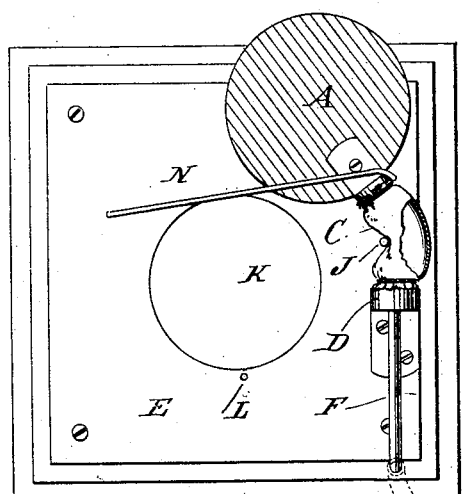
Figure 3:
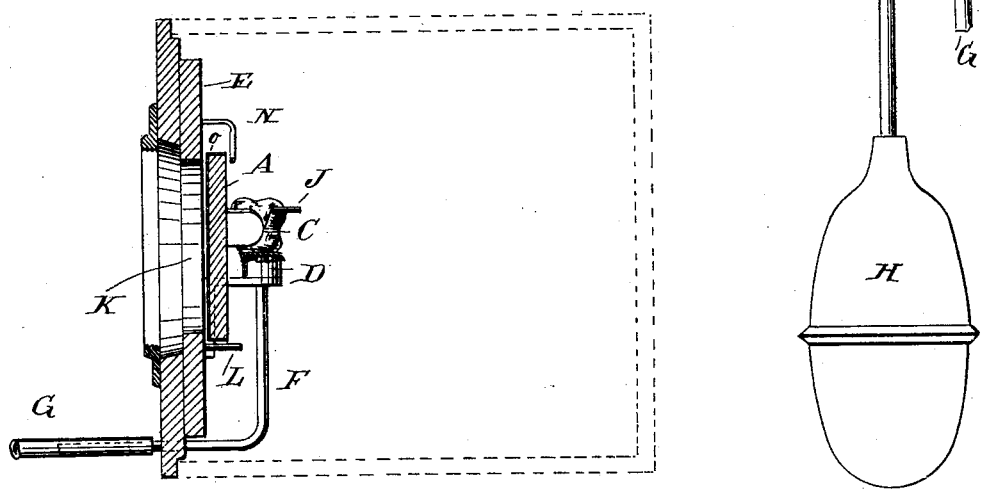

Figure 1 is a rear elevation of the front plate of a camera provided with my improved shutter, showing the shutter closed. Fig. 2 is a like elevation, showing the shutter opened, parts being broken out and shown in section. Fig. 3 is a cross-sectional elevation of the same on the line $x\, x$, Fig. 1, the shutter being shown closed.

A shutter, A, consisting of a disk or plate of wood, metal, or other suitable material, is attached to the upper end of a piece of elastic or flexible tubing, C, the lower end of which is held to the upper end of a cup, D, attached to the inner surface of the front plate, E, of a camera. A rectangularly-bent tube, F, is connected with the cup D and projects from the front of the front plate, E. A flexible tube, G, preferably made of rubber, has one end connected with the outer end of the tube F, and to the opposite end of the flexible tube G a bulb, H, preferably made of rubber, is attached. A pintle or stud, J, projects from the inner surface of the front plate, E, between the short flexible tubing C and the opening or lens aperture K in the plate E, the said tubing C resting against the stud or pintle J. A check-stud, L, projects from the inner surface of the plate E, below the opening K, to prevent the shutter A from dropping too low. A guide wire or frame, N, is secured across the inner surface of the plate E a short distance from the same above the aperture K, and serves as a guide for the shutter A, which passes under it in its movements, and also forms a check to prevent opening the shutter too far, as shown in Fig. 2.

The surface of the shutter A, resting against or facing the inner surface of the front plate, E, is covered with a layer, O, of velvet, plush, or analogous material to exclude the light. If the bulb H is compressed the air is forced out of the same through the tubes G and F into the tubing C, which is distended, and will stand erect at the side of the pintle C. By erecting itself the said tubing throws the shutter A upward in the direction of the arrow $a'$, whereby the lens-aperture K will be opened. The pintle J forms the turning-point of the shutter A. As long as the tubing C remains distended it remains stiff and erect and holds the shutter open. As soon as the pressure is removed from the bulb H the air passes into the same and the tubing C collapses and permits the shutter A to drop in the inverse direction of the arrow $a'$ until it strikes the stud L, whereby the lens-aperture K is closed. The camera-shutter can thus be operated by a person standing some distance from the camera, and without requiring the said person to touch or handle the camera.

The shutter A can be opened or closed slowly or rapidly, accordingly as the bulb H is compressed slowly or rapidly, and the shutter can be arranged to slide by slightly modifying the position of the tubing C.

If desired, the shutter can be made of two parts, which swing laterally in the vertical plane. Each part is attached to a piece of flexible tubing, in the manner described, and the two pieces of tubing are attached to the ends of a horizontal tube, connected with the air-bulb, for producing the compressed air. If the bulb is compressed both parts forming the shutter will swing upward and outward simultaneously.

Having thus described my invention, I claim as new and desire to secure by Letters Patent—

1. The combination, with a swinging camera-shutter, of a piece of flexible tubing bent and attached to the same, and devices for forcing air into the said tube for the purpose of expanding, stiffening, and straightening the same, substantially as herein shown and described, and for the purpose set forth.

2. The combination, with a swinging camera-shutter, of a piece of expansible and contractible tubing connected directly to the shutter and serving as the means for hinging or pivoting the shutter, said tubing being connected with devices for forcing air or gas thereinto, substantially as described, and for the purpose set forth.

3. The combination, with a camera-shutter, A, of a piece of flexible tubing attached to the same, a device for forcing air into the said tubing, and a stud against which the said tubing rests, substantially as herein shown and described, and for the purpose set forth.

4. The combination, with the camera-shutter A, of the flexible tubing C, attached to the same, the stud J, against which the tubing C rests, the cup D, to which the tubing C is attached, and a device for forcing air into the tubing, substantially as herein shown and described, and for the purpose set forth.

5. The combination, with the camera-shutter A, of the flexible tubing C, the stud J, the cup D, the tube G, and the bulb H, substantially as herein shown and described, and for the purpose set forth.

6. The combination, with the camera-shutter A, of the flexible tubing C, the stud J, the cup D, the tube F, extending from the cup D to the front of the plate E, the tube G, connected with the tube F, and the bulb H, attached to the tube G, substantially as herein shown and described, and for the purpose set forth.

7. The combination, with the camera-shutter A, of the flexible tubing C, the stud J, a device for forcing air into the tubing C, and the check-stud L, substantially as herein shown and described, and for the purpose set forth.

8. The combination, with the camera-shutter A, of the flexible tubing C, the stud J, a device for forcing air into the tubing C, and the check and guide-frame N, substantially as herein shown and described, and for the purpose set forth.

CHARLES H. SCOFIELD.

Witnesses:
MATTHEW McCORMICK,
JAMES B. PADDON.